Oct. 9, 1962   J. H. GUYTON ET AL   3,057,557
TRANSISTORIZED HEATER CONTROL SYSTEM
Filed April 16, 1959   2 Sheets-Sheet 1

INVENTORS
BY James H. Guyton, &
George M. Gaskill
Robert E. Fowler
ATTORNEY

Oct. 9, 1962  J. H. GUYTON ET AL  3,057,557
TRANSISTORIZED HEATER CONTROL SYSTEM
Filed April 16, 1959  2 Sheets-Sheet 2
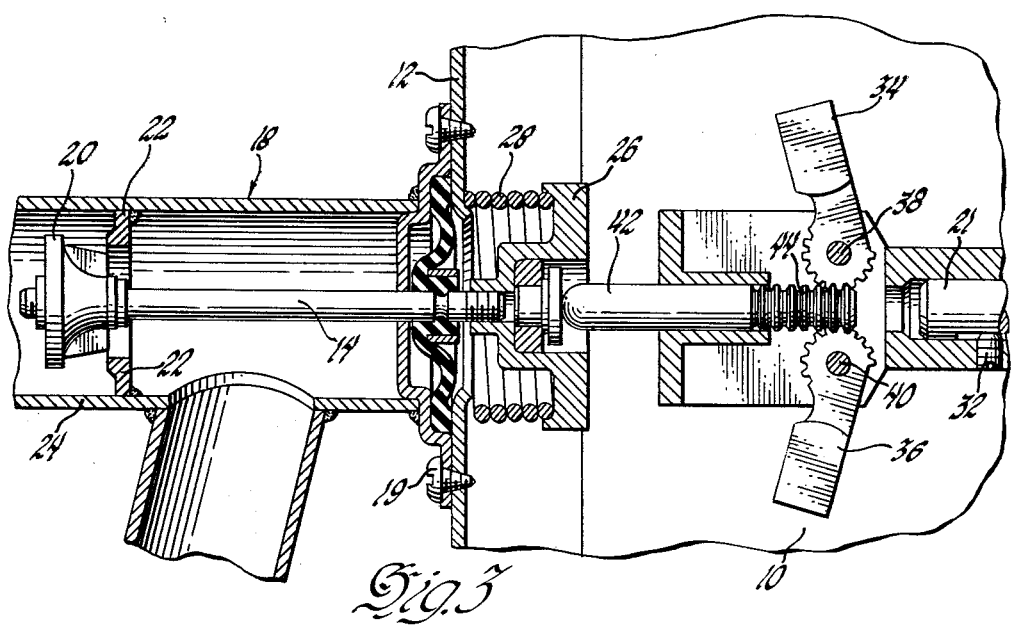
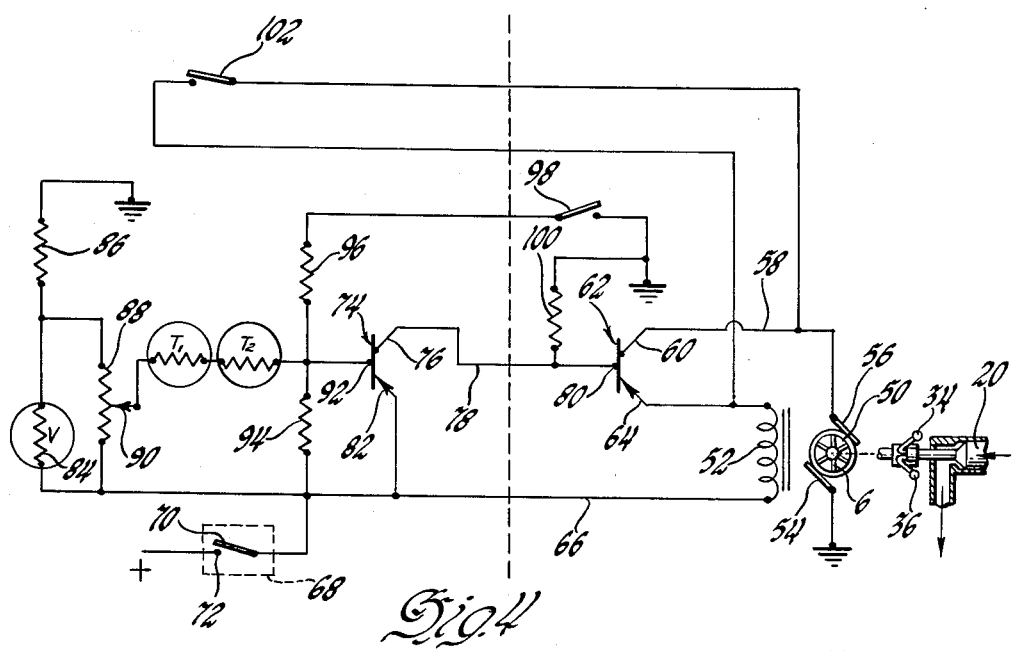
INVENTORS
BY James H. Guyton, &
George M. Gaskill
Robert E. Fowler
ATTORNEY

United States Patent Office 3,057,557
Patented Oct. 9, 1962

3,057,557
TRANSISTORIZED HEATER CONTROL SYSTEM
James H. Guyton and George M. Gaskill, Kokomo, Ind., assignors to General Motors Corporation, Detroit, Mich., a corporation of Delaware
Filed Apr. 16, 1959, Ser. No. 806,977
3 Claims. (Cl. 236—38)

This invention relates to an electronic electro-mechanical control system and more particularly to a control system capable of varying a plurality of factors to provide satisfactory composite or resultant control of energy sources. While our control system may be adaptable for many uses, it can well be illustrated by application to a heater control system for automotive vehicles. The supply of heat for the interior of an automobile may be varied by two different factors (1) the amount of and temperature of a fluid (water) circulating through the heater radiator coils within the car body, and (2) the amount of air forced over the radiator coils to pick up the heat therefrom and convey it into the car interior. The control systems now being used for automobile heating equipment are quite complicated and require considerable adjustment by the driver in order to maintain a suitable temperature in the car. In general the occupants are either too hot or too cold and the adjustment is only made after they feel uncomfortable and move the controls toward the opposite temperature indication.

It is an object of the present invention to provide means for adjusting the amount of heated fluid which may flow through the radiator to regulate the temperature output of the heating system and to simultaneously adjust the amount of air flow over the radiator coils through which the heated fluid flows.

It is a further object in making this invention to provide a single unitary means for controlling both the heated fluid flow and air flow to provide the proper temperature.

It is a still further object in making this invention to provide a suitable control circuit for the unitary heater system driving means.

With the above and other objects in view, which will become apparent as the specification proceeds, our invention will be best understood by reference to the following specification, claims and the illustrations in the accompanying drawings in which:

FIGURE 3 is a further enlarged and similar section to FIGURE 2 showing the control valve in open position; and, FIGURE 4 is a circuit diagram showing a control circuit for the heater motor.

As previously mentioned the amount of heat supplied to an enclosure may be regulated by changing the amount of heated fluid flowing through radiator coils and/or by the amount of air blown over these heated coils and passing into the enclosure. At the present time many of the automobile heater systems merely change the amount of air blown over the heater coils through which cooling water for the engine circulates. The temperature of this water, of course, is dependent upon the operation of the engine. While some heater systems currently are supplied with thermostats, the thermostat is located at the output of the blower duct from the heater and is not too sensitive to the general temperature in the vehicle. Applicants have devised a system for supplying heat to an automotive vehicle by the use of a single series motor which motor drives the conventional blower fan and at the same time operates mechanism for varying the position of a control valve in the system for regulating the amount of hot water flowing through the heater coils.

Figure 1:
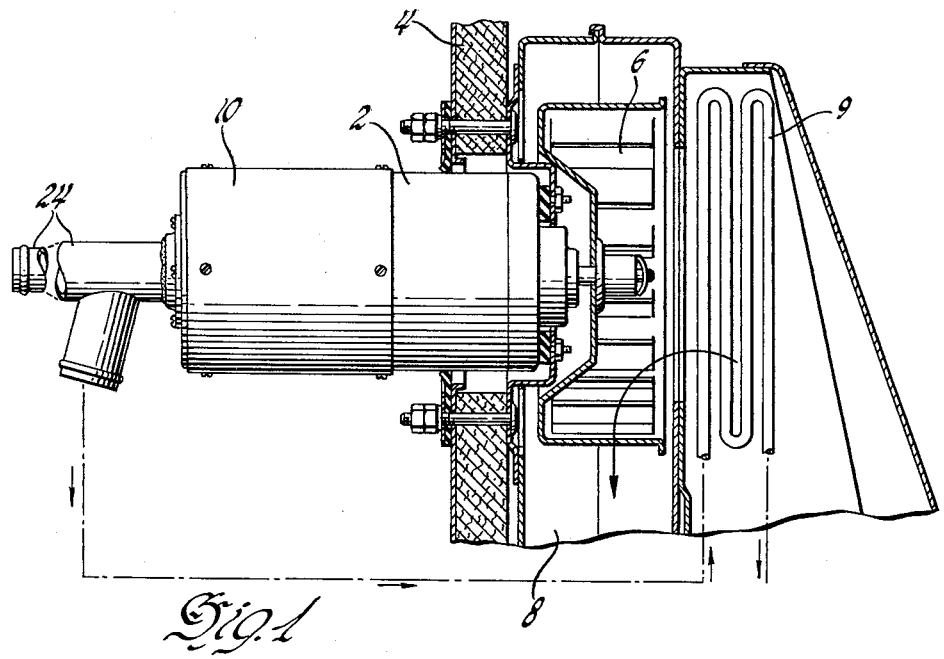
FIGURE 1 is a vertical section taken through the fire wall of an automotive vehicle showing the heater driving motor of our invention.

Referring more particularly to FIGURE 1, there is shown therein a small series heater motor 2 mounted in the fire wall 4 of an automotive vehicle and having mounted on one end of the shaft a blower fan 6 which is supplied to blow air over the radiator coil 9 of the heater. This air is discharged through a duct 8 to the interior of the car to heat the same. An auxiliary housing 10 is secured to the motor housing to enclose the opposite end of the motor shaft and to support a duct 18 through which heated water flows to the coils 9 of the heater. This housing 10 carries an end plate 12 having a central opening therein in which there is supported a control valve rod 14 which may move longitudinally. Some sealing means such as a flexible washer 16 surrounds the rod 14 and supports it in the opening but prevents any water from escaping from the heating system into the motor housing.

Figure 2:
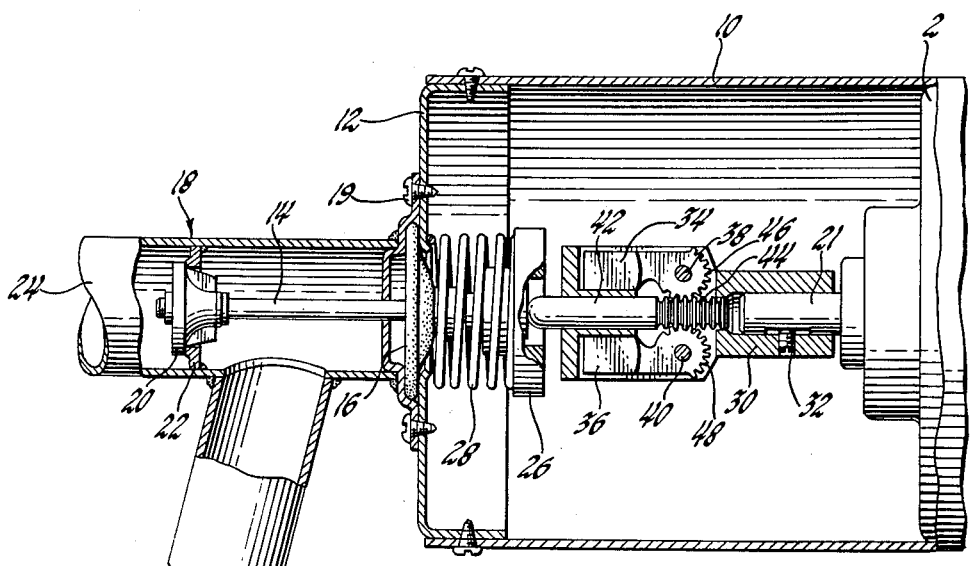
FIGURE 2 is an enlarged, sectional view taken through one end of the motor housing showing the mechanism for operating the circulating water control valve, said valve being in closed position.

The end wall 12 supports the Y-shaped duct 18 in any suitable manner such as screws 19 and water flows from the cooling system of the engine through the duct to the coils 9 of the heater. A movable valve member 20 carried on the end of the rod 14 extends into a valve seat 22 inside of the arm 24 of the Y-shaped member 18 to control the flow of fluid through this portion of the system. In order to bias the rod 14 to the right as shown in FIGURE 2 there is secured to the inner end of the rod a flat disk 26 and a coil spring 28 is placed between the lefthand face of the disk 26 and the inner surface of the end wall 12. This spring, therefore, tends to close the valve consisting of members 20 and 22 to prevent liquid flow through the connection. The lefthand end of the motor shaft 21 extends into a hollow coupling member 30 and is secured thereto by a set screw 32. This coupling member 30 carries two centrifugal governor members 34 and 36 which are mounted on pivots 38 and 40, respectively, on said coupling member. These pivots are at right angles to the major axis of the coupling member and support the members 34 and 36 so that they may be thrown outwardly due to centrifugal force as the shaft 21 rotates and act as a flyball governor. The central portion of the coupling member 30 just to the left of the end of the motor shaft is bored out to support a short stub shaft 42. This stub shaft carries a plurality of circular rack teeth 44 at its inner end which rack teeth are adapted to mesh with arcuate toothed sections 46 and 48 of the members 34 and 36, respectively. The stub shaft 42 may both rotate and move axially in the coupling member 30. Thus as the motor 2 speeds up the two weights or the unbalanced weight of the pivoted members 34 and 36 cause them to be thrown outwardly by centrifugal force and the toothed sections 46 and 48 drive the stub shaft 42 to the left as shown in FIG. 3 tending to collapse spring 28 and force valve 20 away from its seat to permit liquid flow through the Y section 18.

In the operation of the system, when the car is cold to obtain maximum heating it is desired to have the maximum amount of hot water circulate through the heater coil 9 and also to apply as much air flow across the heater coil as possible. Thus in starting the car it is desired to have the motor 2, as soon as there is 100° F. water in the heater coils, operate at its maximum speed. When it does so, the maximum amount of air is supplied by the blower 6 to blow over the heating coils and extract as much heat as possible from the coils. This also causes the two centrifugal weights 34 and 36 to fly outwardly to their maximum position, driving stub shaft 42 to the left as shown in FIGURE 3, collapsing spring 28 and moving valve 20 away from valve seat 22 to permit maximum liquid flow through the Y connection 18. Thus the maximum amount of heat from both water and air circulation is obtained. As the temperature in the car rises and it is necessary to decrease the amount of heat supplied to prevent overheating, this is accomplished by reducing the motor speed. This has a dual effect. It cuts down on the amount of air supplied to flow over the heater coils and at the same time reduces the amount of hot water flowing through the coils from which heat is extracted. A single control circuit may be provided for this purpose.

FIGURE 4 shows such a system for controlling the series motor 2. This series motor has an armature 50 and a field winding 52. One of the brushes 54 which contact the armature is grounded and the second brush 56 is connected through conductor 58 to the collector electrode 60 of transistor 62. The emitter electrode 64 of this transistor is connected to one terminal of the field winding 52 of the motor. The opposite terminal of the field winding is connected to the main power bus 66. A main control switch 68 having a movable arm 70 directly connected to the main power bus has its stationary contact 72 connected to a suitable source of power such, for example, as the vehicle battery indicated as +. It will thus be seen that the field winding 52, the transistor 62 and the armature 50 of the motor are all connected in series with the source of power when switch 68 is closed. By regulating the flow of current through the transistor 62 the speed of the motor can be directly regulated and in this instance the amount of heat supplied varied to suit the need. When the armature speed changes, the governor weights 34—36 control the valve 20 to vary the fluid flow as diagrammatically indicated in the lower righthand portion of FIGURE 4.

In the current system there is provided one amplifier stage which is controlled by temperature sensitive means. This consists of transistor 74 which has its collector electrode 76 directly connected through line 78 to the base 80 of the transistor 62 to control the input bias. The emitter electrode 82 of transistor 74 is directly connected to the main power source. Since the voltage of the supply may vary, a voltage regulator section is provided which consists of a varistor 84 connected in series with a resistance 86 between the power supply line 66 and ground. Connected in shunt to the varistor 84 is a resistance 88 having a variable tap 90 movable thereover to adjust the voltage applied to the transistor amplifier 74. The tap 90 is connected through two serially connected thermistors $T_1$ and $T_2$ to the base electrode 92 of the transistor 74 to determine the bias input thereto. These two thermistors are the temperature sensitive elements which control the system and while they may be placed at various different locations in order to control the inside car temperature, it is suggested that one be placed at some location such as on the back of the front seat and the other placed in the air flow output for the heater. A biasing resistor 94 is connected between the power supply line 66 and the base 92 and a second resistance 96 is connected in series with a manually operable switch 98 between the base 92 and ground. A further biasing resistor 100 is connected between base 80 of transistor 62 and ground. A second manually operable switch 102 is connected across between one terminal of the field winding 52 and brush 56 of the armature to shunt out the control transistor and run the motor regardless of the temperature control system for purposes to be described.

In the operation of the heater control system as shown herein the varistor 84 and resistance 86 tend to regulate the voltage applied to the transistor amplifier control system with variations in the voltage supply. Thermistor $T_1$ as mentioned previously may be mounted in the heater discharge so that it is responsive to the temperature of the air issuing from the heater. Thermistor $T_2$ may be located at any desired location within the car body, for example on the back of the front seat or some other location which appears to maintain a proper over all comfortable temperature for the car. The two thermistors $T_1$ and $T_2$ control the input signal to transistor 74 and the output of this transistor is connected directly to the input of the second transistor 62. Transistor 62 is directly in series with the field and armature of the heater motor 2 and, therefore, controls the current flow through the motor and the speed thereof. Switch 68 is the main on-off switch. When all of the components have been properly mounted in the vehicle and the thermistors located as indicated above the switch 68 may be closed. If at this time the interior of the vehicle is below a comfortable temperature the bias provided on the base of the transistor 74 by the two thermistors $T_1$ and $T_2$ is such as to cause this transistor to be substantially non-conducting and, therefore, in turn the bias on the base of the transistor 62 will be high and that transistor will be fully conducting. Maximum current will flow through the circuit from power supply + through switch 68, line 66, field 52, emitter 64, body of transistor 62, collector 60, line 58, brush 56, armature 50, brush 54 to ground. Under these conditions the motor will operate at its maximum speed supplying a maximum amount of air to blow over the surface of the heating coils and also to open the valve 20—22 in the fluid supply line so that the heating fluid may circulate through the heating coil at a maximum rate.

As the temperature in the enclosure rises the resistance of thermistors $T_1$ and $T_2$ will be reduced permitting more current to flow in transistor 74 and reducing the bias on the base of transistor 62 to cut down the current flow through that transistor and through the motor armature and field to slow the motor. This slowing down of the motor 2 simultaneously reduces the amount of air flow over the heating coils 9 and the flow of heated fluid through said coils. It might be mentioned at this time that the two thermistors $T_1$ and $T_2$ are not of the same sensitivity but that $T_1$, which it was suggested be placed at some location in the car, be much more sensitive than $T_2$, which may be located in the duct leading from the heater coils. Thus it will require a much larger change in temperature at the output duct to produce the same change in motor current as would be required in car temperature.

As the heat within the vehicle increases the current flow through the transistor 62 will be cut more and more to reduce the speed of the motor and the amount of heat supplied until at some value of current the amount of heat supplied by the motor will equal or balance the amount of heat lost by the vehicle body and the heater motor will substantially float or remain at constant speed. If the outside temperature then changes either by rising or falling it will be necessary for the system to re-balance itself but this is done automatically with no adjustment by the operator. Further, the fact that the motor shaft has a viscous load on one end of the shaft in the form of the blower permits it to run smoothly and make small adjustments in the valve position evenly. Through the use of this system the switch 68 may, in effect, remain closed all the time the ignition switch is on or the car is operating, for, if the temperature inside the body is too high, the thermistors will so bias the amplifier that there is insufficient current flow through transistor 62 to cause the blower motor to rotate at all so no heat is provided and, therefore, the heater system will remain inactive until such time as heat is required when it will automatically come into action without any adjustment on the part of the operator. By the use of this system the heater control system may remain in the same condition winter or summer and if a cool evening is encountered the heater system will automatically immediately come into play and heat up the interior of the vehicle to that temperature for which it was permanently set. If the temperature exceeds that point the system will remain inactive without the necessity of the operator opening the switch or shutting it off in any other way.

In order to further control the heater in accordance with other variable factors it may be found advisable to mount a third control thermistor on the outside of the body which is sensitive to outdoor temperature. This additional thermistor would be connected in series relation with $T_1$ and $T_2$ in the base circuit of transistor 74 to assist in the overall control.

If it is desired to run the blower motor for defrosting purposes regardless of the temperature inside the body of the vehicle, switch 102 may be closed. This provides an independent energizing circuit for the motor. So long as switch 102 is closed the motor will run and when it is opened the motor 2 will stop unless the conditions of the heater control system call for heat.

There may be some instances when, in first getting into a vehicle in cold weather, it is undesirable to have the blower motor immediately come on full force until the water temperature has risen to some degree. Switch 98 is provided to prevent the control motor from being energized until the water temperature has had an opportunity to warm. Switch 98 is a thermal switch, closed when cold, mounted on the motor. As long as this thermally operated switch on the engine is closed transistor 74 is conducting and transistor 62 is off and the motor will not run. When engine temperature increases switch 98 will open and the system will operate normally as described above.

The dash line through the center of FIGURE 4 indicates the preferred location of the components; those to the right of the line ordinarily being located in the engine compartment and those to the left inside the car body.

What is claimed is:

1. In an automotive heating system, a driving motor, radiator means through which fluid is adapted to flow, valve means therein to control the flow of fluid through the radiator means, blower means mounted adjacent the radiator means and connected mechanically to the driving motor, mechanical valve operating means operably connected to the driving motor so that energization of the driving motor simultaneously supplies air blown over the radiator means and mechanically adjusts the position of the valve with variations in speed of the driving motor to control the amount of fluid flow through the radiator means, a source of electrical power, a plurality of temperature sensitive electrically conductive means located at different points, at least one of which is mounted adjacent the radiator means and another in the enclosure within which the automotive heater is mounted, and transistor amplifying means having an input and an output circuit, said input circuit being connected to said plurality of temperature sensitive means and to said source of electrical power and said output circuit being connected to said driving motor and said source of electrical power so that changes in ambient temperature at different locations will control the current flow in the input circuit and the speed of the driving motor and the amount of circulating fluid in the radiator means.

2. In an automotive heating system, a driving motor, radiator means through which fluid is adapted to flow, valve means therein to control the flow of fluid through the radiator means, blower means mounted adjacent the radiator means and connected mechanically to the driving motor, mechanical valve operating means operably connected to the driving motor so that energization of the driving motor simultaneously supplies air blown over the radiator means and mechanically adjusts the position of the valve with variations in speed of the driving motor to control the amount of fluid flow through the radiator means, a source of electrical power, a plurality of temperature sensitive electrically conductive means located at different points, at least one of which is mounted adjacent the radiator means, transistor amplifying means having an input and an output circuit, said input circuit being connected to said plurality of temperature sensitive means and to said source of electrical power and said output circuit being connected to said driving motor and said source of electrical power so that changes in ambient temperature at different locations will control the speed of the driving motor and the amount of circulating fluid in the radiator means, and a thermally controlled switch adapted to be mounted on the automotive engine and connected to said transistor amplifying means and ground closed when cold to maintain the driving motor deenergized until the fluid circulating through the radiator means has had an opportunity to reach a set temperature.

3. In an automotive heating system, a driving motor including an armature and a field winding, radiator means through which fluid is adapted to flow, valve means therein to control the flow of fluid through the radiator means, blower means mounted adjacent the radiator means and connected mechanically to the driving motor, mechanical valve operating means operably connected to the driving motor so that energization of the driving motor simultaneously supplies air blown over the radiator means and mechanically adjusts the position of the valve with variations in speed of the driving motor to control the amount of fluid flow through the radiator means, a source of electrical power, a plurality of temperature sensitive electrically conductive means located at different points, at least one of which is mounted adjacent the radiator means and another in the enclosure within which the automotive heater is mounted, transistor amplifying means having an input and an output circuit, said input circuit being connected to said plurality of temperature sensitive means and to said source of electrical power and said output circuit being connected in series relation to the armature and field winding of said driving motor and said source of electrical power so that changes in ambient temperature at different locations will control the current flow through the armature and field winding and thus the speed of the driving motor and the amount of circulating fluid in the radiator means, a thermally controlled switch adapted to be mounted on the automotive engine and connected to said transistor amplifying means and ground closed when cold to maintain the driving motor deenergized until the fluid circulating through the radiator means has had an opportunity to reach a satisfactory temperature, and a shunt circuit connected across the transistor amplifying means including a second and manual switch which when closed will cause the driving motor to be energized regardless of all other conditions.

References Cited in the file of this patent

UNITED STATES PATENTS

| | | |
|---|---|---|
| 1,482,759 | Meyers | Feb. 5, 1924 |
| 1,699,067 | Holmgren | Jan. 15, 1929 |
| 1,909,870 | Rosino | May 16, 1933 |
| 2,656,114 | Woods | Oct. 20, 1953 |
| 2,864,978 | Frank | Dec. 16, 1958 |
| 2,872,595 | Pinckaers | Feb. 3, 1959 |
| 2,875,392 | Pinckaers | Feb. 24, 1959 |